(No Model.)  
J. P. WRIGHT.  
MATCH MAKING MACHINE.
No. 603,459. Patented May 3, 1898.
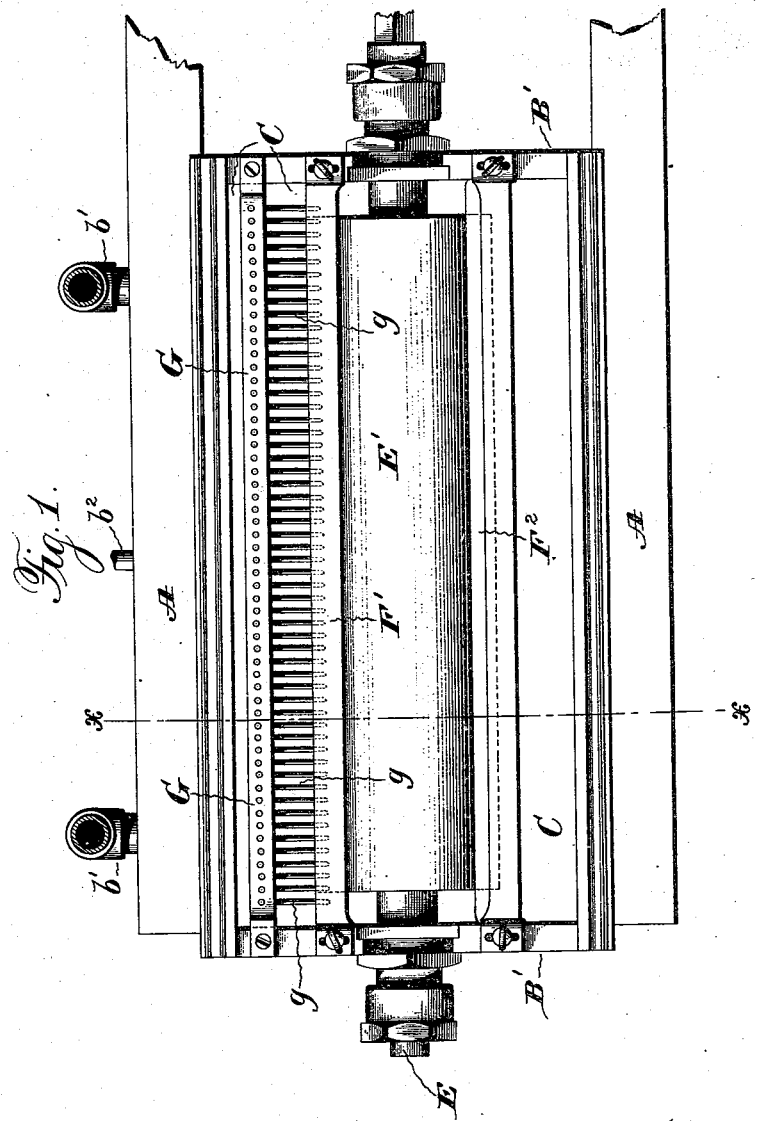

(No Model.) 2 Sheets—Sheet 2.
J. P. WRIGHT.
MATCH MAKING MACHINE.

No. 603,459. Patented May 3, 1898.

Witnesses:
Jas. E. Hutchinson.
Henry C. Hazard.

Inventor:
Jacob P. Wright
by Prindle and Russell
his Attorneys

UNITED STATES PATENT OFFICE.

JACOB P. WRIGHT, OF NEW HAVEN, CONNECTICUT, ASSIGNOR TO THE DIAMOND MATCH COMPANY, OF CHICAGO, ILLINOIS.

MATCH-MAKING MACHINE.

SPECIFICATION forming part of Letters Patent No. 603,459, dated May 3, 1898.

Application filed December 22, 1896. Renewed October 7, 1897. Serial No. 654,377. (No model.)

*To all whom it may concern:*

Be it known that I, JACOB P. WRIGHT, of New Haven, in the county of New Haven, and in the State of Connecticut, have invented certain new and useful Improvements in Match-Making Machines; and I do hereby declare that the following is a full, clear, and exact description thereof, reference being had to the accompanying drawings, in which—

Figure 3:
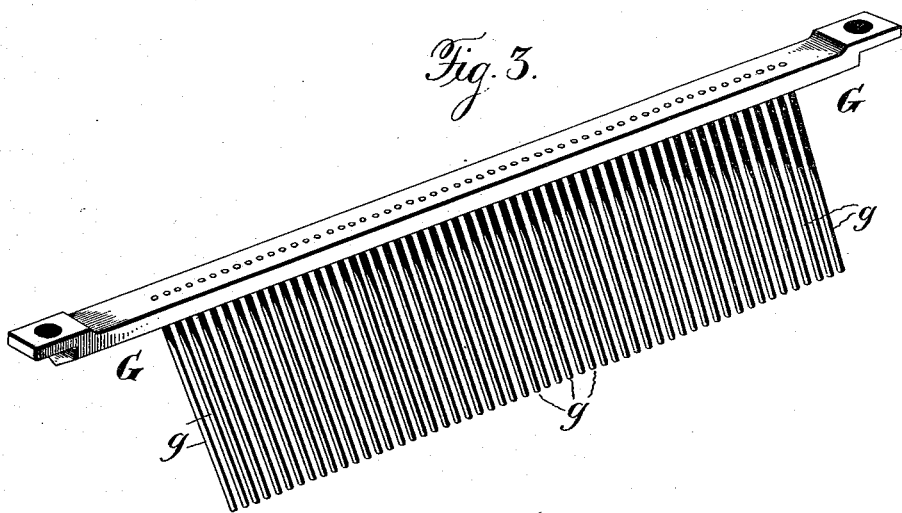
Figure 2:
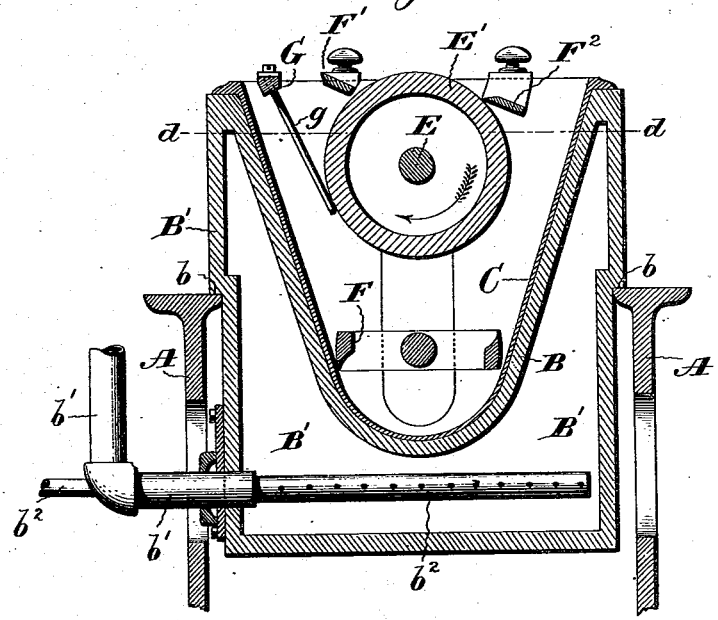

Figure 1 shows a plan view of the composition-dipping mechanism of a match-making machine with my invention applied thereto; Fig. 2, a view of a section on line $x\,x$ of Fig. 1, and Fig. 3 a detail perspective view of my stick-arresting device.

Letters of like name and kind refer to like parts in each of the figures.

The object of my invention has been to provide an improvement in the composition dipping or applying mechanism of match-making machines which shall prevent any loose match-sticks or pieces of sticks which may get into the composition during the operation of the machine from being brought up in position to adhere to the portions of composition applied to the match-stick ends in the carrier; and to this end my invention consists in the mechanism and in the construction, arrangement, and combination of the parts thereof, as hereinafter specified.

While my invention is shown and will be described hereinafter as applied to the form of composition dipping or applying mechanism set forth in the United States patent to Beecher and Wright for a machine for making matches, No. 528,457, I do not limit myself to its application to such form of mechanism, but contemplate using it in connection with other constructions of composition-applying devices in which the composition is taken from a vat and carried up into position to be applied to the head ends of the match-splints held in a suitable carrier.

In the drawings, A A designate the frame, upon which the composition-applying mechanism is supported. The casing B of such mechanism, containing the cavity for the composition-vat C and a closed heating space or jacket B', partially surrounding said cavity, has shoulders $b\,b$ resting upon the frame A A.

As in the dipping or composition-applying mechanism shown and described in the patent hereinbefore referred to the space B' is to be supplied with hot water by means of the pipes $b'\,b'$, which are to be connected with means for heating the water and causing it to circulate through the said space and pipes. A third pipe $b^2$, entering the space B', is to supply steam for heating the water when it is desired that the heating should be quickly done.

The purpose of providing the space with warm water is, as will be understood from the specification of the patent referred to, to keep the composition in the vat D, resting in the cavity in casing C, constantly warmed up to the proper point to maintain it in the required semiliquid condition for application to the match-sticks.

Upon a shaft E, supported in suitable bearings $e\,e$ on the ends of the vat D, is the composition-applying roller E', which, being partially submerged in the body of composition within the vat, will as it rotates in the direction of the arrow in Fig. 2 take up on its periphery a layer of composition and convey it upward into position for the lower ends of the match-sticks in the moving stick-carrier to dip into as they are moved along by the movement of the carrier. Such carrier and the means for revolving the shaft E are not shown or described herein, as they form no part of my present invention and are fully set forth in the United States patent hereinbefore referred to.

Within the composition-vat, below the roller E', is the stirrer F, and above the body of composition are the layer-regulating scraper F' and the roller-clearing scraper $F^2$, all as shown in said patent.

In composition-applying devices of the kind described it has been found that loose match-sticks and pieces of sticks from the carrier are liable to get into the composition in the vat during the operation of the machine and then be carried up with the layer of composition on the roller E' into the path of the ends of the match-sticks moved along by the stick-carrier. They will then adhere to the head-forming portions of composition applied to the sticks in the carrier and, connecting the heads of several matches together, will spoil such matches and make trouble when the latter are discharged from the carrier and when it is attempted to box the matches. To prevent any loose sticks or pieces of sticks mingled in the composition in vat D from being thus carried up by the roller and applied, with the composition, to the ends of the matches in the carrier, I provide a clearer G, consisting of a bar attached to the top of vat D and extending across the same parallel to the roller E' on the side of the latter, which travels upward from the composition. Secured to this bar and projecting downward and inward therefrom toward a point on the roller-periphery, which is well below the top of the body of composition, as indicated by the dotted line $d\ d$ in Fig. 2, are the fingers $g\ g$, close enough together to prevent the passage between them of any loose sticks or pieces of sticks, but far enough apart to allow the flow of the semi-liquid composition between them. These fingers, which can be made of small metal rods or wires, have their inner and lower ends in contact with the roller-periphery or close enough thereto to stop and guide away from the roller even small pieces of sticks which may be in the part of the composition which is in contact with the roller when the fingers are reached. With these fingers extending upward and outward, as shown, any sticks or pieces of sticks engaged by them will, as the roller revolves and the composition is consequently caused to move upward in the side of the vat, where the fingers are, be guided up toward the edge of the vat, where they will collect below the bar of the clearer and may be readily removed.

With the fingers arranged as described and extending well below the top of the body of composition it has been found that the sticks can be arrested and guided away from the roller in the manner described without interfering with the carrying up of the desired layer of composition from the vat by the roller, for the composition flowing easily upward between the fingers collects in a uniform mass immediately after passing the fingers, and the desired layer of composition is taken up on the periphery of the roller from this mass.

Having thus described my invention, what I claim is—

1. In a composition-applying mechanism for match-making machines, in combination with the receptacle for the composition and a moving feeder moving partly in and partly above the composition, a clearer extending down into the composition, with its lower end close to the feeder, and having a series of narrow openings for the passage of the composition, substantially as and for the purpose specified.

2. In a composition-applying mechanism for match-making machines, in combination with the receptacle for the composition, the rotary roller partially submerged in the body of the composition in the receptacle, and the clearer having a series of fingers with their ends submerged in the composition close to the periphery of the roller, substantially as and for the purpose described.

3. In a composition-applying mechanism for match-making machines, in combination with the receptacle for the composition, the rotary roller partially submerged in the body of the composition in the receptacle, and the clearer having a series of fingers, with narrow spaces between them, extending down into the body of the composition, with their lower ends close to the periphery of the roller, substantially as and for the purpose set forth.

4. In a composition-applying mechanism for match-making machines, in combination with the receptacle for the composition and the rotary roller partially submerged in the body of the composition, the clearer consisting of a bar suitably supported and extending across the space within the receptacle and a series of fingers extending downward and inward toward the roller, to a point below the top of the body of composition, and having their lower ends close to the periphery of the roller, substantially as and for the purpose shown.

In testimony that I claim the foregoing I have hereunto set my hand this 15th day of December, 1896.

JACOB P. WRIGHT.

Witnesses:
L. A. BEECHER,
H. DAYTON STANNARD.